United States Patent [19]

Ciaperoni et al.

[11] 4,143,031

[45] Mar. 6, 1979

[54] COPOLYESTER COMPOSITIONS FOR THE PRODUCTION OF FIBERS HAVING HIGH HEAT STABILITY AND RESISTANCE TO THE PROPAGATION OF THE FLAME, PROCESS FOR MAKING THE SAME, AND FIBERS MADE FROM SAID COMPOSITIONS

[75] Inventors: Aldemaro Ciaperoni, Bollate; Giuseppe Quaglia, S. Giorgio su Legnano; Gino Dall'Asta, Milan, all of Italy

[73] Assignee: SNIA Viscosa Società Nazionale Industria Applicazioni Viscosa S.p.A., Italy

[21] Appl. No.: 728,206

[22] Filed: Sep. 30, 1976

[30] Foreign Application Priority Data

Oct. 8, 1975 [IT] Italy ................. 28059 A/75

[51] Int. Cl.$^2$ ............... C08G 63/18; C08G 63/66; C08G 63/76
[52] U.S. Cl. .............. 260/45.75 B; 260/45.75 F; 260/45.75 K; 528/166; 528/177; 528/180; 528/181; 528/190; 528/191; 528/194; 528/201; 528/202

[58] Field of Search ........ 260/47 C, 45.75 B, 45.75 F, 260/45.75 K; 528/190, 191, 194, 201, 202, 166, 177, 180, 181

[56] References Cited

U.S. PATENT DOCUMENTS

| | | | |
|---|---|---|---|
| 3,794,617 | 2/1974 | Mains et al. | 260/47 C |
| 3,935,166 | 1/1976 | Kanai et al. | 260/47 C |

*Primary Examiner*—Lester L. Lee
*Attorney, Agent, or Firm*—McGlew and Tuttle

[57] ABSTRACT

There is described a family of copolyester compositions for producing heat and flame resistant fibers, said compositions being prepared by polycondensating (A) an aromatic diacid, (B) a diol, (C) a tetrabrominated diol, (D) a derivative of a polyvalent metal, all said components being hereinbelow defined, the polycondensation process being carried out in several successive stages of copolycondensation of components (A), (B) and (C) until reaching a stable viscosity, then adding component (D), and stopping the reaction before the intrinsic viscosity of the composition decreases below a value proper for subsequent spinning.

30 Claims, No Drawings

COPOLYESTER COMPOSITIONS FOR THE PRODUCTION OF FIBERS HAVING HIGH HEAT STABILITY AND RESISTANCE TO THE PROPAGATION OF THE FLAME, PROCESS FOR MAKING THE SAME, AND FIBERS MADE FROM SAID COMPOSITIONS

BACKGROUND OF THE INVENTION (a) The Field of the Invention

The present invention relates in general to copolyester compositions for the production of fibers having high heat stability and resistance to the propagation of flame, to a process for making the same and to the copolyester textile fibers made from said compositions.

More particularly this invention refers to the production of copolyester fibers resistant to the propagation of flame, obtained from copolyester compositions containing, besides the normal components of polyethyleneterephthalate, a tetrabrominated diol and one or more oxides, preferably antimony or titanium oxide or borates of polyvalent metals, preferably zinc.

(b) The Prior Art

The technology for the production of spinnable copolyester compositions and of copolyester fibers which are flame resistant, more precisely resistant to the propagation of flame (that is for the production of so called "self-extinguishing" textile products) is known in the art and there is a patent literature concerning it (see e.g. U.S. Pat. No. 3,794,617 and German patent application publication No. 2,313,298).

To produce such copolyester fibers it is preferable to start from a spinnable copolyester composition including antiflame additives or combinations of such additives rather than to apply an antiflame finish to textile fibers or to finished textile products.

This second method has the well known disadvantage that the antiflame finish is progressively removed in use in the washings of the textile products.

Therefore the more recent technique for the production of antiflame textile products is oriented to the production of copolyester compositions which include one or more antiflame agents. It is known that by copolymerizing the normal components of polyethylene terephthalate with an halogenated, preferably a brominated or chlorinated, diol, flame resistance properties are enhanced. These diols are either chemically bound in the macromolecules or are added as additives. The association to a copolyester composition of the type indicated of antimony oxide, in particular $Sb_2O_3$, which improves the self-extinguishing characteristics, is also known. According to what has been discussed in the art antimony oxide is added in amounts (in the order of 1% to 2% on the weight of the polyester) which are relatively low although they are clearly higher than those in which it would be used as a polycondensation catalyst. An antimony oxide, when not employed as a catalyst, is added to the solid polymer, which is normally in the form of chips or powder. This however has various drawbacks and in particular lowers the polymer molecular weight so much that it becomes unsuitable for the production of yarns.

SUMMARY AND OBJECT OF THE INVENTION

It is an object of this invention to provide a copolyester polymer suited to the production of textile fibers having high properties of heat stability and resistance to the propagation of flame and process for its production, which eliminate all the drawback of the known technique and whereby the desired properties are obtained in filaments and fibers suitable for textile uses. The filaments and the fibers obtained from said polymer are too objects of this invention.

More particularly, an object of the present invention is a copolyester composition for the production of fibers having high heat stability and resistance to the propagation of flame, characterized in that it consists of a copolymer formed by the association of the following units:

(I) OC—$R_1$—CO—, in which $R_1$ is a benzene or naphthalene nucleous and the two OC groups are indifferently in ortho, meta or para position;

(II) —O[$(CH_2)_a$—O]$_b$— in which a represents a whole number from 2 to 4 inclusive and b represents a whole number from 1 to 3 inclusive:

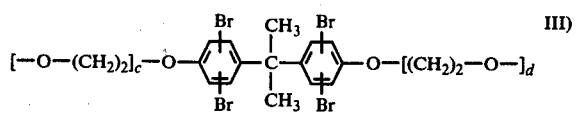

wherein c and d represent, independently the one from the other, a whole number from 1 to 10 inclusive, said copolymer further comprising —O—Y—O bonds, wherein Y is chosen among CO and CO—$R_2$—CO, wherein $R_2$ is an aromatic nucleous having at least three —COOH functions.

A further object of this invention is a process for the preparation of the copolyester compositions according to the invention.

This process is characterized by the polycondensation, in the presence of a conventional catalyst, such as antimony oxide, of the following components:

(A) an aromatic diacid, chosen among terephthalic, orthophthalic, isophthalic and naphthalenedicarboxylic acids or a diester of such an acid;

(B) a diol having the general formula:

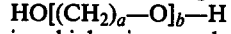

in which a is a number from 2 to 4 inclusive and b is a number from 1 to 3 inclusive;

(C) a tetrabrominated diol having the general formula:

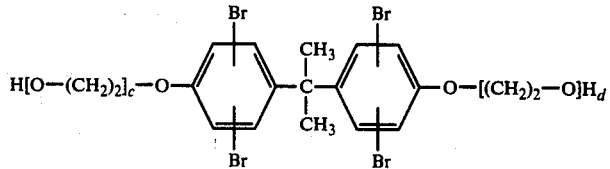

in which c and d represent, independently the one from the other, a whole number from 1 to 10 inclusive;

(D) a derivative of a carboxylic acid chosen among carbonic acid and aromatic carboxylic acids having at least 3 carboxyls;

(E) at least a compound of a polyvalent metal chosen in the group consisting of the oxides of a polyvalent metal chosen among antimony, titanium and zinc, and/or zinc borate being added to the product of said polycondensation.

Preferably, in the diol which constitutes component (B), a is 2 and b is 1.

Preferred examples of carboxilic acids having 3 or more carboxyls are benzenetetracarboxylic acid, naphthalenetetracarboxylic acid, diphenyltricarboxilic acid and diphenyltetracarboxylic acid. As components (D) the derivatives of carboxylic acids chosen among pyromellitic anhydride and diphenylcarbonate are particularly preferred.

The preferred compound of a polyvalent metal is antimony sesquioxide.

Preferably the tetrabrominated diol which cosntitutes component (C) is employed in an amount from 2 to 20% of the whole weight of all the components indicated, whereas the compound of a polyvalent metal is present in an amount from 0.3 and 5%. It is possible to use other additional components, such as catalysts, plastifiers etc., normally used in the preparation of polymers in an amount less than 5% by weight, in particular for the manufacture of polymers for fibers.

The process according to the invention is preferably carried out in several successive stages, which may be characterized as follows: (1) copolycondensing components (A), (B) and (C), until a stable viscosity, evidencing the substantial completion of the polycondensation, is reached; (2) adding component (D) to the molten polycondensate; (3) homogeneizing the resulting composition, in the molten state; and thereafter (4) stopping the reaction before the intrinsic viscosity of said composition decreases below a value acceptable for its subsequent spinning.

More particularly, according to the invention, the components indicated as (A), (B) and (C) are copolymerized according to the known polycondensation technique, until a stable viscosity which indicates the substantial completion of the polycondensation is attained. This is evidenced by the fact that the power absorption of the stirrer which stirs the fluid polycondensate becomes stable. At this point compound (D) — polyfunctional carboxylic acid or derivative thereof — and the compound of a polyvalent metal — animonium oxide or zinc borate — are added to the melt and this latter is stirred in the fluid state until a thoroughly homogeneous mixture is obtained, the reaction being discontinued before the viscosity decreases below the value required for spinning. In general, the intrinsic viscosity required from the polymer employed for textile purposes should not be less than 0.55 dl/g and preferably not less than 0.59 dl/g (measured in a phenol-tetrachloroethane, in a ratio 60/40 by weight at 20° C.). It has been found that a satisfactorily homogeneous mixture can be obtained without decreasing the viscosity below the above limits, a stirring time of 5–45 minutes being generally adequate. During this operation the component (D) reacts with the previously obtained polymer and becomes a part of the polymeric molecule. Preferably the grain size of the $Sb_2O_3$ is 1–50 micron.

The viscosity of the polymer is not less than 0.55 dl/g and preferably than 0.59 dl/g when the polymer is in the form of a powder or chips or in any form that is not the final form of filaments or fibers, whereas in the filaments or fibers the viscosity is not less than 0.45 dl/g and preferably not less than 0.5 dl/g.

The product according to the invention is excellently adapted to the manufacture of textile filaments and fibers, and these are possessed of high mechanical qualities and exhibit a high resistance to heat and to the propagation of flame, as will be explained in still greater detail by means of the following examples.

PREFERRED EMBODIMENTS OF THE INVENTION

Example No. 1

8.0 kg. of dimethylterephthalate, 5.35 kg. of ethyleneglycol, 0.872 kg. of 2,2-bis-3,5-dibromo-4-(2-hydroxyethoxy) phenylpropane, 4.0 g. of manganese acetate and 3.2 g. of antimony sesquioxide are introduced into an autoclave provided with a stirrer.

The mixture is heated to 180°–200° C. for 160 minutes approximately until the distillation of methanol ceases. The reaction mixture is transferred into a second autoclave, also provided with a stirrer, and 1.63 g. of phosphorous acid are added in a nitrogen stream and the mixture is heated to 270° C. under a vacuum. After 4–5 hours, when the power absorption of the stirrer is stable, indicating a stable viscosity and therefore the end of the polycondensation, 88 g. of antimony sesquioxide (in the form of particles which pass through 280 mesh sieve) and 4 g. of pyromellitic anhydride are introduced by means of suitable pipe under a vacuum. Stirring is carried out for 20' under a vacuum, then the mass is estruded under nitrogen pressure in 20'–30'.

The chemical analysis of the chips obtained by mixing the results of four tests identical to that described above, yields $[\eta]$ = 0.67 dl/g (measured in a phenol-tetrachloroethane, 60/40 by weight, mixture at 20° C.); diethyleneglycol content 0.87% by weight; terminal carboxyl groups 39.4 equiv./tonn.; degree of yellow 14%; degree of white 21% (Elrepho method).

An amount of product (kg. 24) is spun at spinning head temperature 285° C.; the spinning speed is 680 m/min., the yarn titer is 615 den.; $[\eta]$ is 0.56 dl/g. The analysis furnishes a Br content of 4.7%, $Sb_2O_3 \simeq 1\%$. The spun yarn is drawn at 107° C. and the drawing is regular; the characteristics of the drawn yarn are: elongation 11%, tenacity 4.1 g/den., titer 152.5 den., retraction 10.45%.

From this yarn a stocking having weight of 90–100 g/m² is made; from this 15×7.5 cm. samples are prepared for submission to inflammability test UNI 5420-64. By this test the flame propagation time, viz. the time during which the flame lasts while spreading on the sample before it goes out after the igniting flame has been removed, and the burnt length of the test sample after an ignition of 4 sec., are measured. The results of the test, carried out on 5 samples, are listed in the following Table, compared with the results obtained under the same conditions from a standard polyethyleneterephthalate.

TABLE

| | Test samples n° | | | | | Average |
|---|---|---|---|---|---|---|
| | 1 | 2 | 3 | 4 | 5 | |
| opacized polyethylene terephthalate; count den/fil 150/32 (weight 100 g/m²) | | | | | | |
| Flame (sec) | 0 | 5 | 8 | 32 | 15 | 12.5 |
| Length (cm.) | 12 | 7.5 | 5.5 | 15 | 15 | 11 |
| Flame retarded, | | | | | | |

TABLE-continued

|  | Test samples n° |  |  |  |  | Average |
|---|---|---|---|---|---|---|
| opacized, copo lyester having the same count |  |  |  |  |  |  |
| Flame (sec.) | 0 | 0 | 4 | 0 | 0 | 1 |
| Length (cm.) | 9 | 10 | 9.5 | 8 | 8 | 9 |

As it is seen from the table the copolyester obtained according to Example 1 has a greater resistance to the propagation of flame than the standard polyethyleneterephthalate and in particular has higher self-extinguishing properties.

Example No. 2

The same operation as in Example 1 carried out but using 3.3 g. of diphenylcarbonate in place of pyromellitic anhydride.

The polymer obtained, having [η] = 0.62 dl/g., is spun under the same conditions described in Example 1. In this case too the spinning occurs regularly. The test samples obtained from the yarn are submitted to the UNI 5420-64 test. The average of the 5 combustion tests is flame propagation time, 3 secs.; burnt length, 9 cm.

Example No. 3

8.3 kg. of terephthalic acid and 7.75 kg. of ethyleneglycol are reacted in a stirred autoclave, provided with a distillation column. The temperature of 200° C. is reached in a nitrogen stream, then the heating continues up to 250° C. at the nitrogen pressure of 4 atmospheres. While this pressure is maintained, the water is distilled from the top of the column at 150°-155° C. The esterification is considered completed in 150'; then the mass is transferred into the second polycondensation autoclave, operating as in Example 1. After 5 hours, when the power absorption of the stirrer is stable, 88 g. of Sb₂O₃ having the same grain size as in Example 1 and 4 g. of pyromellitic anhydride are introduced. Stirring is carried out for 25 min. under a vacuum, then the mass is extruded under nitrogen pressure in 20-30 min.

The polymer containing 4.5% of bromine and 1% of antimony sesquioxide has [η] = 0.62 and is spun in the way already described.

Example No. 4

The same operations described in Example 1 are carried out with the same initial charges of reagents and catalysts, but at the end of the polycondensation (stirring power stable) 264 g. of Sb₂O₃ with the same grain size as in Example 1 and 5.6 g. of pyromellitic anhydride are added. Stirring is carried out for 15' under a vacuum and then the mass is extruded as in Example 1. The resulting polymer contains 4.8% of bromine and 3% of Sb₂O₃ and has [η] = 0.6, carboxyl groups 59 equiv/ton., degree of yellow 14% and degree of white 25%.

Example No. 5

The same operations as in Example 4 are carried out adding 7 g. of pyromellitic anhydride with 450 g. of antimony sesquioxide. The polymer contains 4.5% of bromine and 4.7% of Sb₂O₃ and has [η] = 0.59.

The examples described are illustrative and not limitative and the invention may be carried into practice with all the modifications which are within the capacity of a person skilled in the art.

The embodiments described are preferred because of the raw materials are easily available and have a low cost, because their processing is well know etc. However the invention has been carried out successfully using, for instance, propylene glycol and butylene glycol as unit II (with reference to the definition of the composition according to the invention) viz. as component B (with reference to the definition of the process).

We claim:

1. Copolyester composition for the production of fibers having high heat stability and resistance to the propagation of the flame, wherein said composition consists essentially of a copolyester formed by the association of the following units:

(I) —OC —R₁—CO—, wherein R₁ is a benzene nucleus and the two OC groups are indifferently in ortho, meta or para position;

(II) —O[(CH₂)ₐ—O]ᵦ— wherein "a" represents a whole number from 2 to 4 inclusive and "B" represents a whole number from 1 to 3 inclusive;

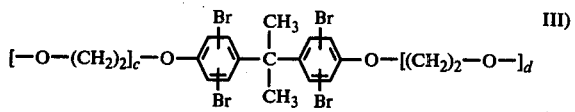

wherein "C" and "d" each represents, independently the one from the other, a whole number from 1 to 10 inclusive, the said copolymers further comprising —O—Y—O bonds, wherein Y is selected from the group consisting of CO and CO—R₂—CO, wherein R₂ is an aromatic nucleus having at least 3 —COOH functions, said —O—Y—O deriving from a compound which is added at the end of the co-polycondensation, and comprising at least 0.3 percent by weight of a compound of a polyvalent metal selected from the group consisting of antimony, titanium, zinc and zinc borate, the polymer, in its condition of powder or chips or particles, before its transformation to a useable fiber state, has an intrinsic viscosity not lower than 0.55 dl/g. measured in a phenol/tetrachloroethane 60/40 (by weight) solution at 20° C.

2. Process for making a copolyester composition adapted for the production of fibers having high heat stability and resistance to the propagation of flame, which comprises effecting polycondensation of the following components:

(A) An aromatic diacid, selected from the group consisting of terephthalic, orthophthalic, and isophthalic acids and diesters of such acids;

(B) a diol having the general formula: HO[(CH₂)ₐ—O]ᵦ—H
wherein "a" is a number from 2 to 4 inclusive and "b" is a number from 1 to 3 inclusive;

(C) a tetrabrominated diol having the general formula

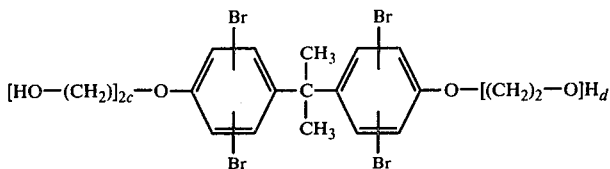

wherein "c" and "d" each represent, independently the one from the other, a whole number from 1 to 10 inclusive:

(D) compound selected from the group consisting of carbonic acid, aromatic carboxylic acids having at least 3 carboxyls; and anhydrides of said acids;

at least 0.3% by weight of a compound of the polyvalent metal oxide selected from the group consisting of the oxides of antimony, titanium and zinc, and/or zinc borate being added to the product of the said polycondensation, said derivative being added at the end of the polycondensation.

3. Composition according to claim 1, containing at least 1% by weight of antimony sesquioxide.

4. Process according to claim 2, wherein are added additional components selected from the group consisting of catalysts, and plastifiers, in an amount not higher than about 5% by weight of the total of all the components in said composition.

5. Composition according to claim 1, wherein in the unit (II), "b" is 1.

6. Composition according to claim 1, wherein in the unit (II), "a" is 2.

7. Composition according to claim 1, wherein in the unit (III), the —COOH function of the aromatic nucleus $R_2$ has a chain of the same polymer substituted in place of H.

8. Composition according to claim 1, wherein in the unit (III) "c" and "d" are 1.

9. Copolyester composition according to claim 1, wherein said viscosity ranges between about 0.67 and about 0.59.

10. Copolyester composition according to claim 1, wherein the polymer, brought to the usable fiber state, has an intrinsic viscosity not lower than about 0.45 dl/g. measured in phenol/tetrachloroethane 60/40 (by weight) solution at 20° C.

11. Copolyester composition according to claim 10, wherein said viscosity is not less than 0.5 dl/g.

12. A textile fiber, having high mechanical characteristics, high heat stability and significant resistance to the propagation of the flame, made of a copolyester composition according to claim 1.

13. Process according to claim 2, wherein as component (D) an anhydride or an ester or carbonic acid or a carboxylic acid is employed.

14. Process according to claim 2, wherein a diol (B) is used wherein "a" is 2 and "b" is 1.

15. Process according to claim 2, wherein a tetrabrominated diol (C) is used wherein "c" is "d" and is 1.

16. Process according to claim 2, wherein the aromatic carboxylic acid (D) is selected from the group consisting of benzenetetracarboxylic acid, naphthalenetricarboxylic acid, naphthalenetetracarboxylic acid, diphenyltricarboxylic acid and diphenyltetracarboxylic acid.

17. Process according to claim 2, wherein a derivative of a polycarboxylic acid selected from the group consisting of pyromellitic anhydride and diphenyl carbonate is used as component (D).

18. Process according to claim 2, wherein antimony sesquioxide is added to the polycondensation product.

19. Process according to claim 2, wherein the tetrabrominated diol (C) represents from 2% to 20% of the overall weight of all the components.

20. Process according to claim 2, wherein the compound of a polyvalent metal is present in an amount from about 0.3 and about 5.0% by weight of overall weight of all components.

21. Process according to claim 2, wherein the antimony sesquioxide is added as a powder having a grain size ranging between about 1 to about 50 micron.

22. Process according to claim 2, wherein additional components are added, such as catalysts, plastifiers and others, used in the production of polyesters for textile purposes, in an amount not higher than about 5% by weight of the total of all the components.

23. Process according to claim 2, wherein said process comprises the following steps:

(1) polycondensing components (A), (B), and (C), until a stable viscosity, evidencing the substantial completion of the polycondensation, is reached;

(2) adding component (D) to the molten polycondensate;

(3) homogenizing the resulting composition in the molten state;

(4) and stopping the reaction before the intrinsic viscosity of said composition decreases below a value acceptable for its subsequent spinning.

24. Process according to claim 23, wherein the polycondensation stage is discontinued when the power absorbed by a stirrer acting on the fluid polycondensate, has become stable.

25. Process according to claim 23, wherein the reaction is discontinued when the intrinsic viscosity of the said resulting composition is not lower than 0.5 dl/g. measured in phenol/tetrachlorethane 60/40 (by weight) solution at 20° C.

26. Process according to claim 25, wherein said viscosity is not lower than 0.55 dl/g.

27. Process according to claim 23, wherein the compound of a polyvalent metal is added substantially concurrently with the addition of component (D) to the molten polycondensate.

28. Process according to claim 24, wherein the homogenization stage, after the addition of component (D), has a duration of from about 5 to about 45 minutes.

29. Process according to claim 24, wherein the homogenization phase, after the addition of component (D), is effected under a vacuum.

30. Process according to claim 24, wherein after the end of the homogenization stage the copolyester compound is extruded under a nitrogen pressure.

* * * * *